United States Patent [19]
Oostenbrink

[11] 3,857,589
[45] Dec. 31, 1974

[54] PIPE CONNECTION WITH CLAMPING RING

[75] Inventor: Albertus Anthony Oostenbrink, Hardenberg, Netherlands

[73] Assignee: Industriele Onderneming Wavin N.V., Handellaan, Zwolle, Netherlands

[22] Filed: Dec. 12, 1972

[21] Appl. No.: 314,359

[30] Foreign Application Priority Data
Dec. 14, 1971 Netherlands.................... 7117153

[52] U.S. Cl................ 285/110, 277/171, 277/209, 277/DIG. 2, 285/345, 285/379, 285/423
[51] Int. Cl........................................... F16l 17/00
[58] Field of Search....... 285/110, 8, 345, 379, 423, 285/230, 231, 331, 390; 277/170, 171, 190, DIG. 2, 209

[56] References Cited
UNITED STATES PATENTS
2,443,145  6/1948  Payne............................ 285/231 X
2,937,891  5/1960  Gressel.......................... 285/390 X
3,645,547  2/1972  Glover........................... 285/110 X FOREIGN PATENTS OR APPLICATIONS
571,139    9/1958   Belgium.......................... 285/110
1,362,532  4/1964   France........................... 285/110
281,193    12/1964  Netherlands..................... 285/110

Primary Examiner—Jordan Franklin
Assistant Examiner—Moshe I. Cohen
Attorney, Agent, or Firm—Wigman & Cohen

[57] ABSTRACT

A pipe connection of a penetrating and a receiving pipe part, and a sealing lip connected with a body part which is held by a clamping ring removably connected with the receiving pipe part. A cavity is present between the inner front side of the clamping ring and the body part.

8 Claims, 3 Drawing Figures

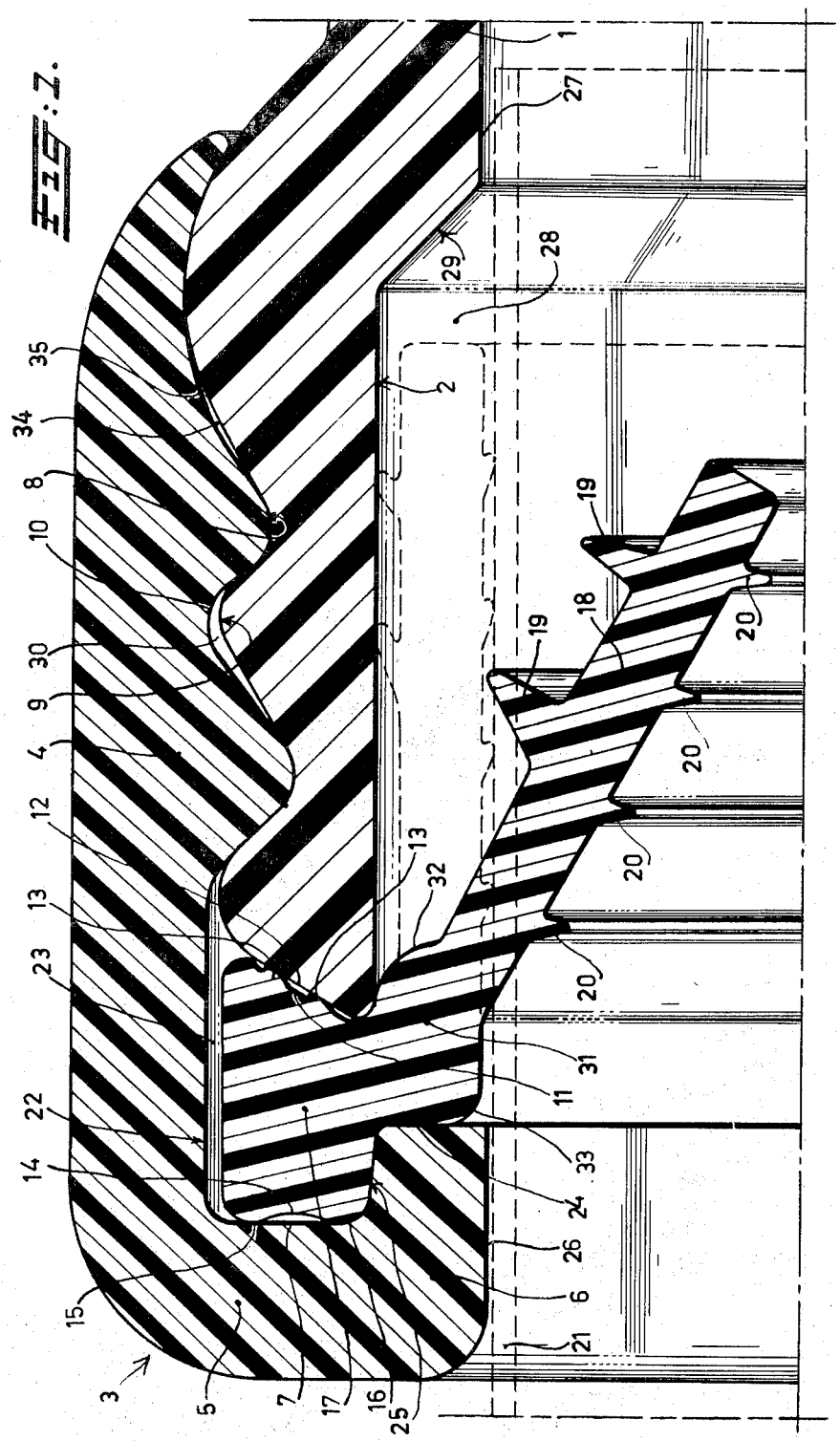

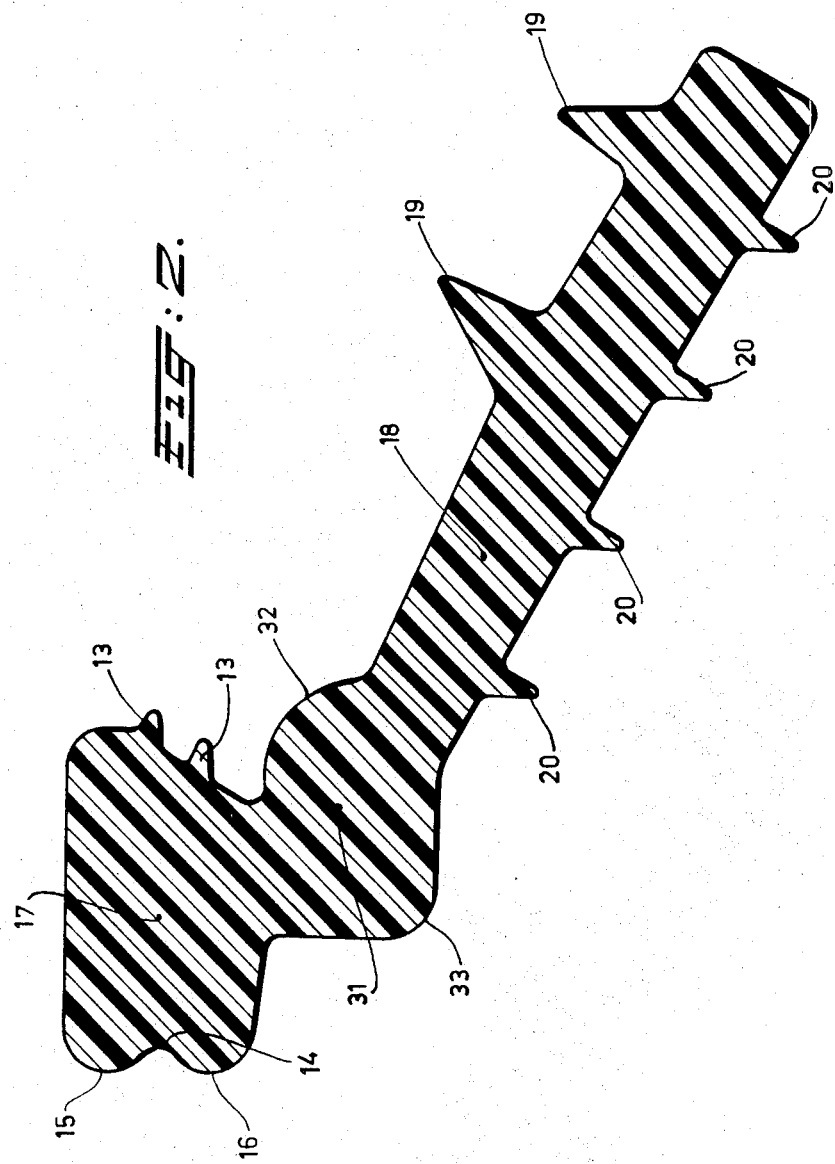

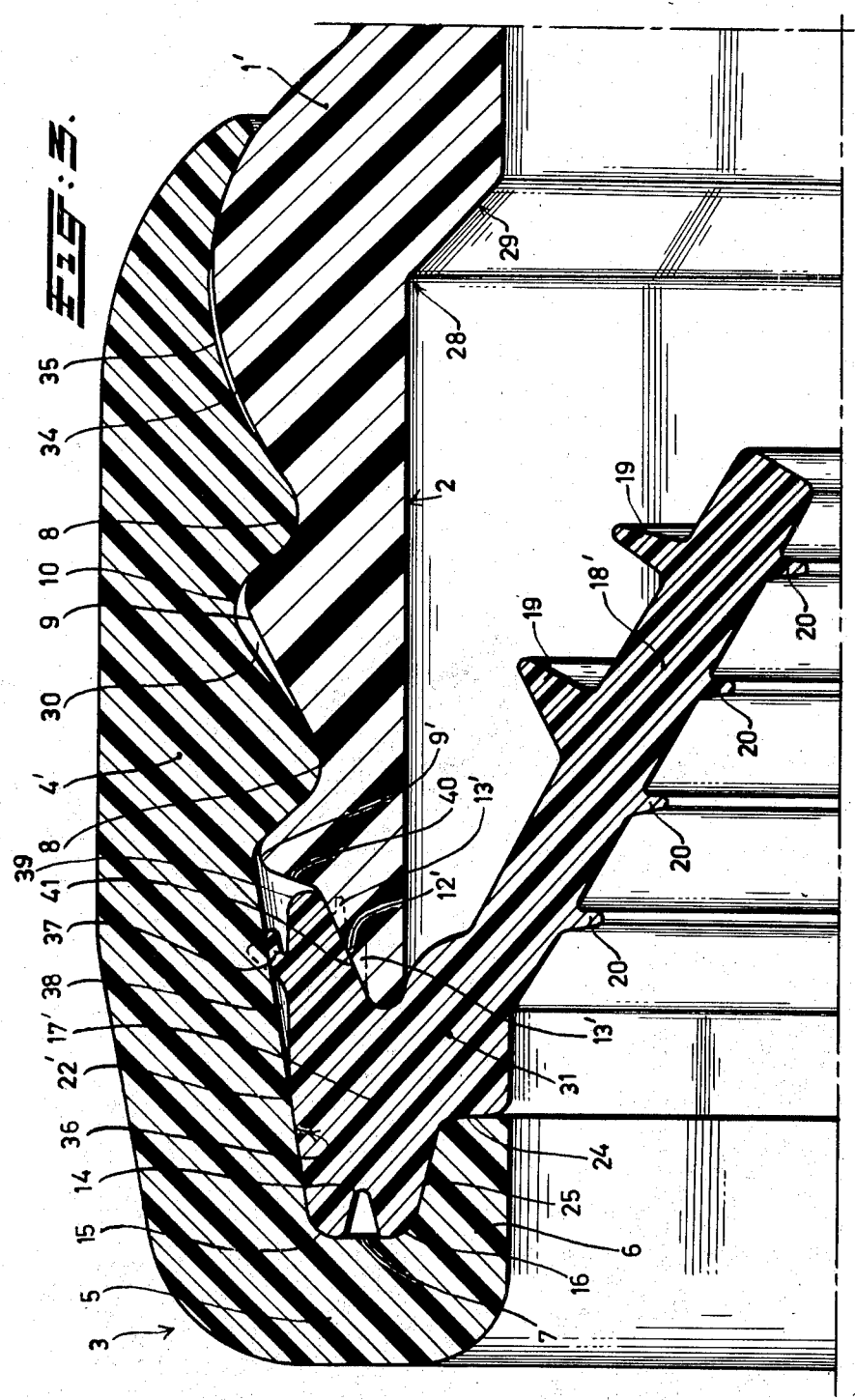

PIPE CONNECTION WITH CLAMPING RING

My invention relates to a pipe connection comprising a penetrating pipe part and a receiving pipe part, the receiving pipe part being provided with a cylindrical widened end, the outer side of which cooperating clampingly with a retaining ring of substantially J-section, the part of the ring, which extends in the direction of the inner side of the receiving pipe part ending at a short distance from the free end of the said pipe part, the diameter of the retaining ring being substantially equal to the inner diameter of the receiving pipe part, and a sealing body part of a sealing being clamped between the bottom of the ring of substantially J-section and the end of the receiving pipe part, the part of the sealing, which is connected with the sealing body part contacting partially the inner side of the widened end of the receiving and penetrating pipe part.

Such pipe connections are known per se, but present particular disadvantages. The retaining ring for instance can be easily damaged when the pipe with ring strikes the surface of the ground at a high angle. Moreover the ring, in case of such a fall, may be slightly displaced whereby the clamping effect is impaired.

My invention aims to obviate these difficulties because the sealing body part only cooperates partially with the bottom of the retaining ring and the latter cooperates resiliently and clampingly with the outer side of the receiving pipe part.

On using these measures, the sealing body part acts as a resilient member supporting the retaining ring, while the resilient clamping permits a certain displacement of the retaining ring.

The local cooperation between the bottom of the ring and the sealing body part is obtained by constructing the sealing body part such that it ends in a point, or by causing the sealing body part to cooperate by two protruding ribs with the bottom and by causing the part of the sealing body, situated between these two ribs to end at some distance from the bottom.

The resilient clamping is particularly obtained by providing the retaining ring with deepenings and heightenings cooperating with corresponding heightenings and deepenings on the outer side of the receiving pipe part in such a way that at least between the retaining ring and the outer side of the receiving pipe part there remains space available. In this way an adequate clamping between the retaining ring and the outer side of the widened end of the receiving pipe part is always ensured.

In particular pipe connections the sealing means are not always sufficiently adapted to prevent medium issuing from the inner side of the pipe line, while on the other hand the sealing body part is possibly not sufficiently retained, or, gets damaged, when the penetrating pipe part is inserted.

This trouble can be overcome by constructing the free end of the receiving pipe part bevelled towards the outer side, while the surface of the sealing body part situated in front thereof is constructed with an identical slope.

The surface of the sealing body part, which cooperates with the bevelled edge is advantageously provided with leakage-preventing projections. These leaking preventing projections appear to be of special importance to prevent leakage even under extraordinary extreme circumstances. Such a leakage is namely not always impossible since it may happen that the penetrating pipe part comes to lie at a particular angle with respect to the receiving pipe part.

For an excellent sealing it is further advantageous that the sealing part is provided with saw tooth projections. Saw tooth projections namely improve the sealing effect between the penetrating pipe part and the sealing part on the one hand and likewise between the inner side of the receiving pipe part and the sealing part on the other hand.

BRIEF DESCRIPTION OF THE DRAWING(S)

FIG. 1 shows a section through a pipe connection according to the invention, and FIG. 2 represents a sealing applied to such a pipe connection.

DESCRIPTION OF PREFERRED EMBODIMENTS

In FIG. 1 there is represented a pipe connection comprising a receiving pipe part 1, the end 2 of which is widened while forming a cylindrical opening 28.

A bridge wall 29 is provided between the inner wall of the receiving pipe part 27 and the inner wall of the opening 28.

The widened end grooves 2 of the receiving pipe part 1 is provided with wave crests 9 and wave grooves 8.

The pipe connection also includes a penetrating pipe part 21.

A sealing member is provided in order to prevent leakage, the sealing member consisting of a sealing body part 17 and a sealing part 18. The sealing part 18 is provided with protruding ribs 19 and 20, which preferably have a saw tooth construction. It has appeared that a saw tooth construction provides a better sealing effect in case of pollution and under undesired extreme circumstances.

The ribs 19 come into contact with the inner wall of the widening 28, while the sealing part 18 is partially spaced from this inner wall. Preferably it should be avoided that the sealing part 18 is deformed in such a way that it is pressed entirely against the inner wall of the opening 28. The ribs 20 are positioned circumferentially along the inner portion of sealing part 18 for sealing the outside surface of penetrating pipe 21 (shown in phantom in FIG. 1).

The sealing means in the shape of the sealing body part 17 and the sealing part 18 are retained by a retaining ring 3. This retaining ring has an J-shaped cross-section and comprises a longitudinal parft 4, with internal thread-like members cooperating with the outer crests 9 of the receiving pipe part at the location of the opening 28 for removably securing thereto, a connecting part 5 which is about perpendicular to the longitudinal part 4, and an inwardly bent retaining ring part 6 complete the retaining ring 3 construction.

The end edge 24 of the inwardly curved retaining ring part 6 end at some distance from the end edge 12 of the receiving pipepart 1 to securely retain sealing body 17 therebetween.

The end edge 12 is bevelled and cooperates with a sealing body part 17 likewise provided with preferably saw tooth shaped, leakage-preventing-ribs 13. These leakage-preventing-ribs prevent moisture, possibly entering along the sealing part 18 with the saw tooth shaped sealing ribs 19, from flowing out. These leakage-preventing-ribs are necessary because the sealing body part 17 lies with clearance in the space between the bottom 7 of the retaining ring and the end of the receiving part.

The sealing body part 17 is preferably spaced from the inner wall 22 of the retaining ring part 4.

The sealing body part 17 is preferably also provided with spaced waveshaped elevations or protrusions 15 and 16 whereinbetween is a wave deepening or recess 14 which does not contact with the bottom 7 of the retaining ring 3. Such an embodiment is advantageous as these projections 15 and 16 together with the recess 14, contribute to the absorption of shocks, when the tube falls to the ground, when part 5 of the retaining ring touches first the ground. It has been found that these shockabsorbing provisions assist particularly in sufficiently retaining the sealing ring and on the other hand have the effect of considerably decreasing the risk of damage to the retaining ring 3. It is evident that also an elevation 15 or 16 can be used.

The diameter of the cylinder which is constituted by the wall 25 is substantially equal to the inner diameter of the opening 28. The diameter of the cylinder which is constituted by the wall 26 of the retaining ring 6 is substantially equal to the inner diameter of the cylinder constituted by the inner wall 27 of the non-widened receiving pipe part.

In order to obtain an adequate resiliently clamping effect between the widened part of the receiving pipe part 1 and the inner side of the part 4 of the retaining ring this part 4 is provided with hollows 10 and 35 with a radius of curvature different from that of the crests and grooves 9 and 8 respectively which are provided on the outer side of the widened part of the receiving pipe part 1. Due to the presence of a circular space 30 between the hollow 10 and the elevation 9 an absolutely safe securing of the retaining ring with respect to the receiving pipe part 1 is insured. An additional second circular space 34 is efficiently provided.

The part 17 of the sealing ring merges preferably, via the bridge piece 31 with a wave-shaped elevation 32 and a rectangular portion with rounded edge 33, into the sealing part 18. As a consequence the centre of rotation of the sealing part 18 comes to lie at a distance from the neck formed by the end 24 of the retaining ring 6 and the free end 12 of the receiving pipe part 1.

According to a preferred embodiment the retaining ring is made of a polyolefinic material, such as polyethylene or polypropylene. polypropylene is preferred.

The receiving and penetrating pipe parts consist preferably of thermoplastic materials such as polyvinylchloride.

FIG. 3 shows a section through a receiving pipe part 1' with a sealing consisting of a sealing body part 17' and a sealing part 18'. In contrast to the receiving part as shown in FIG. 1, the inner wall 22' of the retaining ring part 4' tapers inwardly from the free end of receiving pipe part 1', which pipe part is indicated as pipe part 1 in FIG. 1.

The shape of the outer side part 36 of the sealing body part 17' corresponds substantially to the shape of wall 22'. The outer side 36 is preferably provided with a ring shaped extension 37 which in the deformed state forms a free space 38. The dotted line shows the extension 37 in the undeformed state.

The other end 39 of the sealing body part 17 ends at some distance from an end part 40 limiting the first wave part or elevation 9' on receiving pipe part 1'. On the other hand the slope of end edge 12' is smaller than the slope of end edge 12, so that the sealing body part 17 can be slid easily over the end edge 12' and will also be held in its final position when the retaining ring 3 is slid over the receiving pipe part 1'. It is possible to provide the wall 41 of the body part 17 with leakage-preventing-ribs 13' which are shown in dotted lines. Other parts of FIG. 3 correspond to similar parts of FIG. 1.

What I claim is:

1. A pipe connection comprising a penetrating pipe part and a receiving pipe part, the latter being provided with a cylindrical widened end, the axial end of the cylindrical widened end cooperating clampingly with a retaining ring of generally J-shaped longitudinal cross-section, the part of the ring, which extends in the direction of the inner side of the receiving pipe part ending at a short distance from the free end of said receiving pipe part, the inner diameter of the retaining ring being substantially equal to the inner diameter of the receiving pipe part, and a sealing ring having a sealing body part clamped between the bottom of the retaining ring and the axial end of the receiving pipe part, said sealing ring further including a portion which is connected with the sealing body part and which contacts at least partially the inner side of the widened end of the receiving pipe part and the outer side of the penetrating pipe part, wherein the sealing body only cooperates partially with the bottom of the retaining ring and cooperates resiliently with the axial end of the receiving pipe part, said pipe connection including means for absorbing shock as a result of impact thereto, said means for absorbing shock comprising the sealing body part, the retaining ring provided with hollows and elevations which cooperate with corresponding hollows and elevations provided on the radial outer surface of the receiving pipe part, such that when said retaining ring and receiving pipe part are coupled together spaces remain between engaging hollows and elevations to permit displacement of said retaining ring relative to said receiving pipe part thereby compressing said sealing body part without damaging said respective hollows and elevations when said pipe connection is subjected to impact by being dropped or the like.

2. A pipe connection according to claim 1, wherein the sealing body part includes two protruding ribs which cooperate with the bottom, while the part of the sealing body, which is situated between these two ribs ends at some distance from the bottom.

3. A pipe connection according to claim 1, wherein the pipe receiving part terminates at a beveled edge at its widened end, and the surface of the sealing body part is provided with leakage-preventing ribs which cooperate with said beveled edge.

4. A pipe connection according to claim 1, wherein part of the sealing is provided with sawtooth shaped ribs.

5. A pipe connection according to claim 1, wherein the retaining ring is made of polyolefinic material preferably polypropylene.

6. A pipe connection according to claim 1, wherein the pipe parts are made of thermoplastic material.

7. A pipe connection according to claim 1, wherein the inner wall of the retaining ring part tapers towards the connecting part of the retaining ring and the wall of the sealing body part, cooperating with the said inner wall, tapers in the same way.

8. The connector and sealing device of claim 1 wherein said resilient body comprises protrusions adapted to circumferentially contact the inner surface of said retaining ring and the receiving pipe enlarged end portion for sealing said outer threads when in use, and a generally elongated portion extending into said cavity formed in said receiving pipe enlarged end portion, said elongated portion having a thickness which, when placed in abutting relationship to said receiving pipe enlarged end portion, forms a passageway having a diameter substantially equal to the diameter of the non-enlarged portion of said receiving pipe, said elongated portion of said sealing body including protrusions for fluid sealing a second pipe positioned within said receiving pipe.

* * * * *